(12) United States Patent
Pazel

(10) Patent No.: US 6,489,970 B1
(45) Date of Patent: Dec. 3, 2002

(54) MEANS FOR SPECIFYING DIRECT MANIPULATION RELATIONSHIPS ON HIERARCHICALLY STRUCTURED VISUALS

(75) Inventor: Donald P. Pazel, Montrose, NY (US)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/440,653

(22) Filed: Nov. 16, 1999

(51) Int. Cl.[7] .............................. G06F 3/00; G06F 9/48
(52) U.S. Cl. ....................... 345/763; 345/769; 345/853; 717/113; 709/318
(58) Field of Search ................................. 345/763, 769, 345/853, 841, 835, 762, 764, 770, 855, 846, 856; 717/110, 113, 100, 162, 165; 709/315, 316, 318

(56) References Cited

U.S. PATENT DOCUMENTS

| | | | | |
|---|---|---|---|---|
| 5,530,796 A | * | 6/1996 | Wang | 345/762 |
| 5,724,532 A | * | 3/1998 | Thomson | 345/835 X |
| 5,815,712 A | * | 9/1998 | Bristor et al. | 709/315 X |
| 5,883,639 A | * | 3/1999 | Walton et al. | 345/762 X |
| 6,002,402 A | * | 12/1999 | Schacher | 345/835 X |
| 6,191,807 B1 | * | 2/2001 | Hamada et al. | 345/769 X |
| 6,259,448 B1 | * | 7/2001 | McNally et al. | 345/769 X |

* cited by examiner

Primary Examiner—Raymond J. Bayerl
(74) Attorney, Agent, or Firm—Whitham, Curtis & Christofferson, P.C.; Stephen C. Kaufman

(57) ABSTRACT

A method and apparatus for defining direct manipulation relationships amongst graphical elements of hierarchically structured visuals. The method provides a means for specifying direct manipulation relations in a manner identical to the way they would be utilized in applications. The method captures the direct manipulation specifications as data, which applications may readily utilize to implement those direct manipulation relationships. The direct manipulation relationships are specified at design time, for example, using graphical objects similar to those of the applications, and using graphical gestures identical to the ones to be used in the application. This is a form of direct manipulation by example. Data capturing direct manipulation specifications made in this manner could then be easily used directly in applications.

14 Claims, 17 Drawing Sheets

HSVD = HIERARCHICAL STRUCTURED VISUAL DEFINITION
GED = GRAPHICAL ELEMENT DEFINITION
GES = GRAPHICAL ELEMENT SURROGATE

MEANS FOR SPECIFYING DIRECT MANIPULATION RELATIONSHIPS ON HIERARCHICALLY STRUCTURED VISUALS

CROSS REFERENCE TO RELATED APPLICATION

This application is related to U.S. patent applications Ser. No. 09/409,277, entitled "Utilizing Programming Object Visual Representations For State Reflection," filed on Sep. 30, 1999, by D. Pazel; Ser. No. 09/431,153 entitled "Utilizing Programming Object Visual Representations for Code Generation", filed on Nov. 1, 1999, by D. Pazel; and concurrently filed U.S. application Ser. No. 09/440,654 entitled "Resolution Policy for Direct Manipulation on Hierarchically Structured Visuals", by D. Pazel, all assigned to a common assignee, the entire subject matter of which is incorporated herein by reference.

BACKGROUND OF THE INVENTION

1. Field of the Invention

This invention relates to direct manipulation of graphical objects on a visual display for a computing system. It focuses specifically on graphical objects that are hierarchically composed of other graphical objects, any one of which may engage with any other graphical object through direct manipulation. The invention specifies a method and means for defining direct manipulation relationships between graphical objects, and a means for using that information in applications.

2. Background Description

Direct manipulation, also referred to as drag-drop, in window-based systems has existed for many years. Direct manipulation concerns the relationship between any two graphical objects on a display screen and how they interact when one is dragged over and possibly dropped onto the other. This relationship is programmed into an application or system relating to the graphical objects. It is this programming which both allows or disallows the dragging over, as well as implements a semantic meaning to the drop operation.

The specification of direct manipulation relationships, being programmed in detail per application, is tedious, difficult, and prone to errors. It requires the specification of a number of programming elements, such as specialized data structures and display images, and its programming is usually fragmented into several phases such as initialize drag, dragging-over, and drag-drop. All of this makes the specification of direct manipulation difficult and non-intuitive.

The direct manipulation of graphical objects is especially useful in the area of visual programming languages. The motivation behind visual programming language technology is to utilize visual representations of programming elements to build and generate programs. The field is very large. Generally however, the approaches to visual programming may be classified into the following:

Visual Designers—These are visual programming languages, which focus on the construction of user interface applications. Much of the focus is on interface form and presentation construction with caveats for generating event code to facilitate textual programming of other parts of an application.

Wiring-Based Languages—These languages have visual representations of programming entities, such as objects or processes. Programming proceeds by creating and connecting visual representations with lines, which typically indicate data or event flow.

Structured-Logic Based—These focus on structuring the logic of a program. Typically logic is represented with nested graphical figures which represent logical entities, e.g. if, loops, etc. Typically visual representations of programming objects are not shown in these tools.

Form-Based—These are visual programming languages of the spreadsheet genre. Typically represented as grids or arrays of numbers, a textual macro language typically accompanies the language to do more complex manipulations.

Most visual programming languages are wiring-based. The power of this type of language resides in its ability to represent parallelism. That is, its power is its ability to show either simultaneous, concurrent, or alternate possible executions at the same time. The focus of these types of languages has been a connection paradigm (wires) which generally indicates either event or data flow.

Whereas the connectivity aspect is the chief asset of these languages, it is also its greatest liability. Wirebased language programs become difficult to decipher even in modestly complex examples, as the causal nature of execution rapidly gets lost in the implicit parallelism of the diagram. Also, the visual element that represents the object tends to be limited. Generally, they are either named boxes representing variables, or in iconic representations. In this case, the true dynamic of the language is in connecting these representations, not working with them. At heart, these are execution-based languages to which the data model is secondary. Much more could be gained from clearer and more expansive object detail as interaction amongst visual details could lead to larger interpretations of corresponding inter-programming object possibilities. As a simple example, cross object property assignment could be done with a simple drag-drop operation on graphical elements representing the source and target properties of the corresponding programming objects.

It would be advantageous for direct manipulation relationships, such as that described in the prior paragraph, to be specified to an application dynamically, as opposed to coded within the application. One would, for example, use graphical objects similar to those of the application. Then by performing graphical manipulations, one may explicitly define actions and associate them with some program level activity, such as the generation of program code. This is a form of direct manipulation by example or simulation. Data capturing direct manipulation specifications made in this manner could be used directly in applications to define common application activity. This is the essence of the present invention.

SUMMARY OF THE INVENTION

It is therefore an objective of the invention to provide a method and apparatus for defining direct manipulation relationships amongst graphical elements of hierarchically structured visuals to be used in programming with a visual programming language. The method provides a means for specifying direct manipulation relations in a manner identical to the way they would be utilized in applications. The method captures the direct manipulation specifications as data, which applications may readily utilize to implement those direct manipulation relationships.

According to the invention, the direct manipulation relationships are specified dynamically, for example, using graphical objects similar to those of the application, and using graphical gestures identical to the ones to be used in the application. This is a form of direct manipulation by example. Data capturing direct manipulation specifications made in this manner could then be easily used directly in applications.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
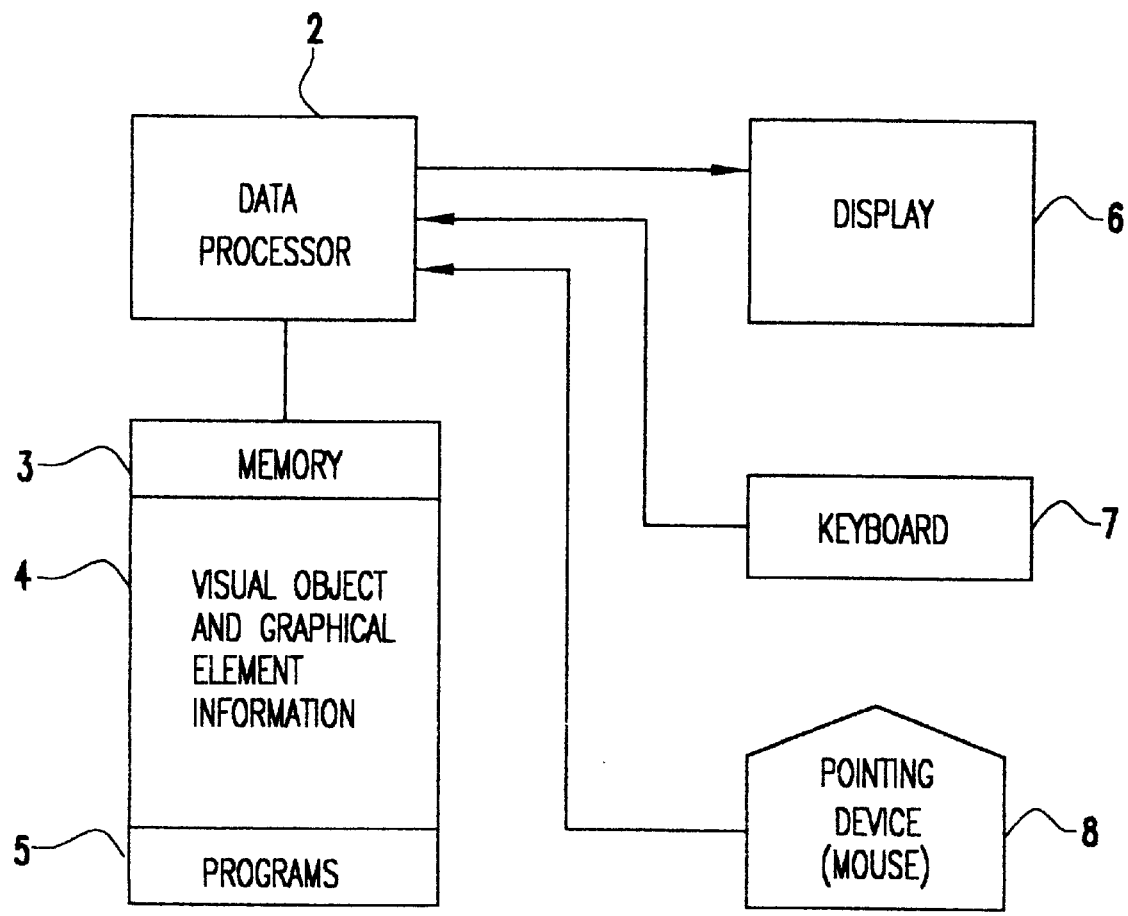
FIG. 1 is a block diagram of a data processing system pertaining to this invention.

The present invention relates to a method and apparatus for applying direct manipulation, also known as drag-drop, to a specific but typical visual graphical object called a hierarchically structured visual (HSV), or visual object for short. A visual object is a distinct graphical entity displayed on a computer display.

The preferred embodiment of the invention is used with a visual programming language that provides a programmer the ability to generate code by manipulating graphical objects on a display device and is best practiced with a visual programming language incorporating the methods of related patent applications entitled "Utilizing Programming Object Visual Representations for State Reflection", U.S. patent application Ser. No. 09/409,277, supra, describing the utilization of graphical elements for representing objects used in programming, "Utilizing Programming Object Visual Representations for Code Generation", U.S. patent application Ser. No. 09/431,153, supra, describing a method for utilizing a programming object's graphical elements to generate computer programs, and "Resolution Policy for Direct Manipulation on Hierarchically Structured Visuals", U.S. patent application Ser. No. 09/440,665, supra, describing a process for detecting which object manipulations take precedence in practice.

In the preferred embodiment, a number of different types of programming objects may be graphically represented including but not limited to local and global variables. These include variables of common types such as, but are not limited to, integer, real, string, character, and Boolean, as well as untyped objects. They also include objects that are derivatives or composites of these and other variables, such as is taught in object-oriented technology, i.e. programming objects based on the classic object-oriented methodology.

In order to generate executable code by manipulating graphical objects, one must define an action to be taken when objects are manipulated in a desired manner. As illustration, suppose a name field on a new object is represented by a graphical object N. A string is represented as graphical object S. A desired action could be that when one drags the graphical object S over graphical object N that the resulting action is to generate code that assigns the string s to the name object. The present invention allows a programmer to define the actions so that when new objects are created, one can generate code based on the actions resulting from the predetermined drag-drop manipulations. This method utilizes hierarchically structured objects to be discussed in more detail below.

A visual object is comprised of a set of nested graphical elements, which are structured hierarchically composing the visual object. However for clarification, in the preferred embodiment of the invention, graphical elements include visual artifacts such as, but not limited to, squares, ellipses, text, and irregular shapes. Properties of these elements include, but are not limited to, size, color, border line type, and border color.

Other geometric shapes such as trapezoids, triangles, and the like are contemplated for use as graphical elements by the present invention. In addition, non-traditional, graphical elements, which rely on techniques of 3-dimensional figures, animations, and the like, are also contemplated. Accordingly, the method and apparatus of the present invention is not limited to any one type of graphical element.

Referring now to the drawings, and more particularly to FIG. 1, there is shown a block diagram of a data processing system for the present invention, as described above. In the preferred embodiment, the data processing system is a personal computer (PC) such as an IBM APTIVA computer (IBM and Aptiva are both registered trademarks of the International Business Machines Corporation). However, other data processing systems are also contemplated for use by the present invention.

Referring again to FIG. 1, the data processing system of the present invention comprises a data processor 2 having a memory 3. The memory 3 is coupled to the data processor 2 via a bidirectional bus. In the preferred embodiment, the memory 3 includes program and data memory. The memory also includes information about visual objects and their graphical elements 4, and programs for manipulating the graphical elements 5.

The graphical information 4 (e.g., visual objects composed as graphical elements) is displayed on the display 6, which is coupled to the data processor 2. In the preferred embodiment, a user data entry device 7, (e.g. keyboard or other interactive device) and a pointing device 8, for example, a mouse or a trackball, are also coupled to the data processor 2.

In the preferred embodiment, the display 6 provides a presentation space in order to display the visual objects of the present invention. In further embodiments, either the pointing device 8 or predefined keys of the data entry device 7 may be used to manipulate the data in conformity with the present invention.

Figure 2:
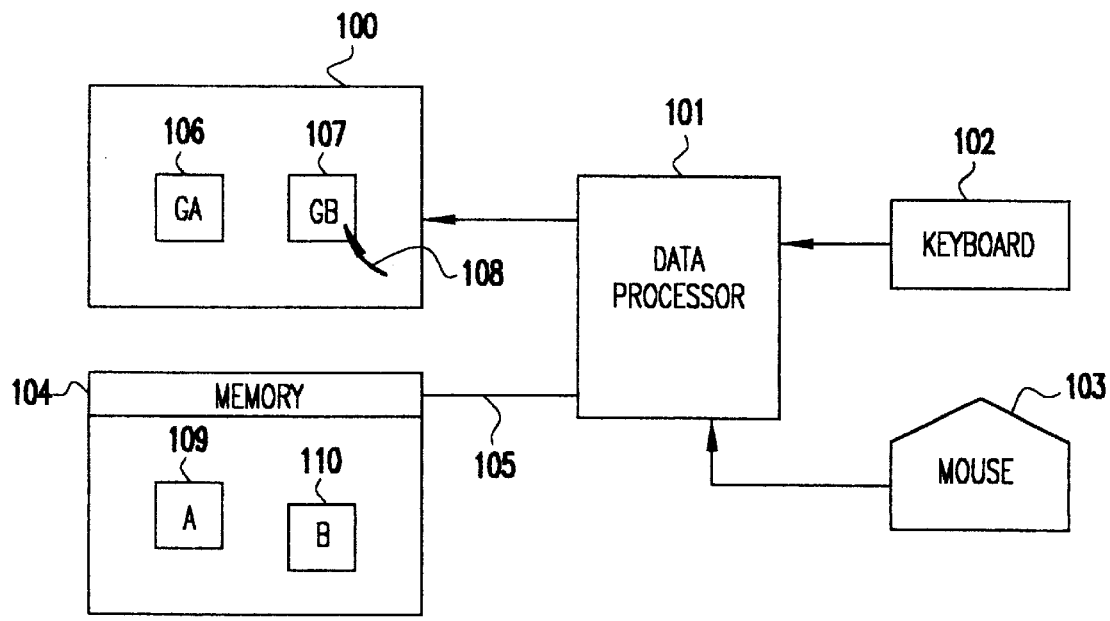
FIG. 2 shows the elements for direct manipulation in a computing system.

Referring now to FIG. 2, there is shown a reference diagram illustrating the idea or concept of direct manipulation as background relating to the present invention. A display device 100 is attached to a data processor 101 that is also attached to a keyboard 102 and mouse 103. The data processor 101 is also attached to memory 104 by a high-speed bus 105. Shown on the display 100 are two graphical objects GA 106, and GB 107. There is also a pointer or mouse indicator 108, which corresponds and reacts in position to the mouse 103. In memory, the information about the visual state of GA and GB, such as but not limited to size, position, and visual composition, is encapsulated within corresponding memory objects A 109 and B 110.

Figure 3:
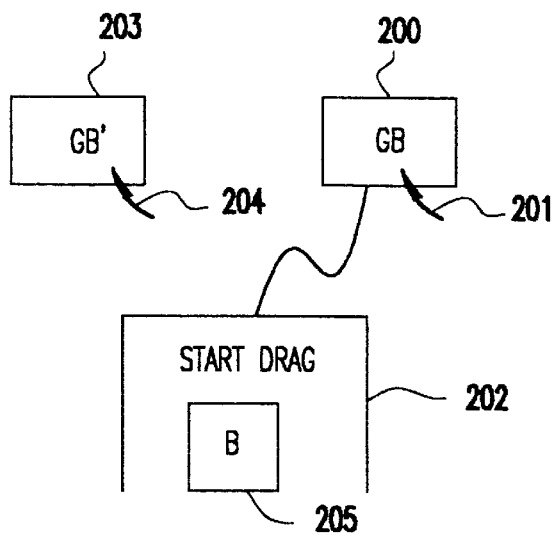
FIG. 3 shows the initialization of direct manipulation.
Figure 4:
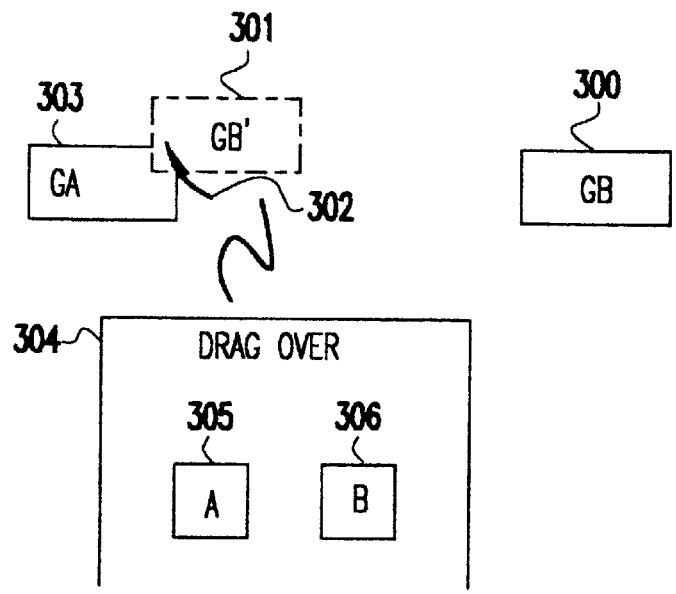
FIG. 4 shows the dragging process of direct manipulation.
Figure 5:
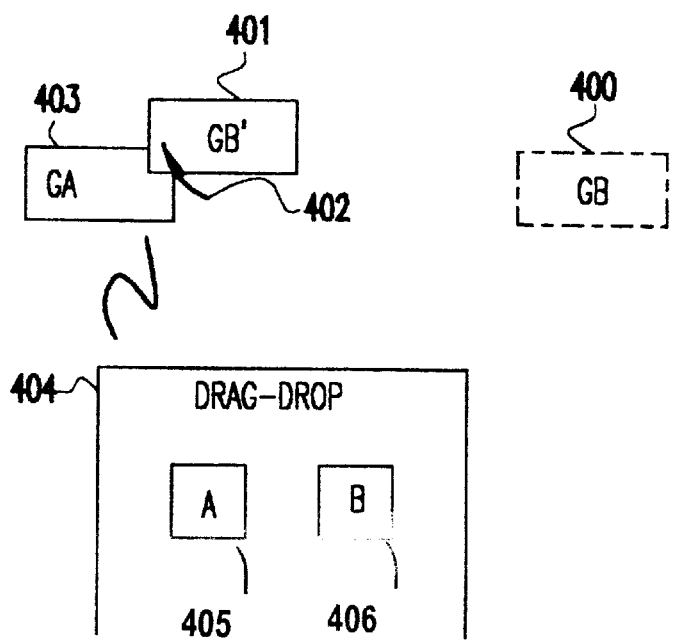
FIG. 5 shows the dropping process of direct manipulation.

Basic operations for direct manipulation, as background reference for this invention, are initializing direct manipulation, dragging a graphical object over another, and dropping a graphical object onto another. These are illustrated in FIGS. 3, 4, and 5 respectively. These three phases are typically delimited by initializing when a mouse button is depressed and possibly moved, dragging while the button remains depressed, and dropping when the button is released. It should be noted that while direct manipulation is typically initialized with the depression of a mouse button, it is not a necessary element, provided that some action or activity delineates the three phases so mentioned. The typical mouse depression/release convention is used for descriptive purposes. Also, it is common to augment these phases of direct manipulation by detecting key depression from a keyboard, wherein at each of the three phases so described, additional or alternative activity may be commenced or carried out during direct manipulation. Finally, as a matter of terminology, the dragging visual object or associated memory objects are designated as acting in a guest role, while drop-area visual objects or associated memory objects are designated as acting in a host role. The following explanation of direct manipulation is commonly implemented in window operating systems.

FIG. 3 shows the initialization of a direct manipulation. Direct manipulation typically commences with a mouse button 201 depression operation while the mouse pointer is over a graphical object GB 200. The application program 202 that manages these graphical objects is then called by the data processor providing the memory object B 205 corresponding to the graphical object GB. At that point, the application program 202 indicates an appropriate drag image GB' 203, to use for the drag operation. After that, motion of the mouse pointer will move the drag image accordingly as long as the mouse button is depressed. Typically, the original visual object, GB 200, remains at its original position at the beginning of this operation, maintaining its original appearance.

FIG. 4 shows the dragging phase of direct manipulation. Here it is assumed that graphical object GB 300 has been initialized for direct manipulation. Its drag image GB' 301 is also shown at a distinct location as dictated by the mouse pointer 302. Being the intermediate phase of direct manipulation, it is assumed in accordance with typical practice of direct manipulation, that the mouse button used to initialize it is currently being depressed. FIG. 4 shows that the drag image GB' partially overlaps another graphical object GA 303. This constitutes what is known as a "drag over" process. Typically, but not by necessity, "drag-over" requires not only the overlap of images as shown, but also that mouse pointer 302 be inside host image 303. This practice is assumed here, but not as a requirement to the practice of the invention.

The application program 304 that manages these graphical objects is then called by the data processor, providing the memory objects A 305 and B 306 corresponding to the graphical objects GA and GB respectively. The application program then indicates whether or not the graphical object GB, as indicated by its drag image GB', may be "dropped" onto GA. Typically, if yes, the point indicator 302 remains a pointer; otherwise, a refusal indicator (not shown).

FIG. 5 shows the dropping phase of direct manipulation. Here it is assumed that graphical object GB 400 has been initialized for direct manipulation. Its drag image GB' 401 is also shown at a distinct location as dictated by the mouse pointer 402. Also shown is graphical object 403, with the drag image GB' overlapping it, with allowance to drop from the dragging operation (i.e., the mouse indicator is a pointer). When the mouse button is released, this is an indication of making a drop of GB, as represented by the drag image 401, onto graphical object GA. When this happens, the application program 404 is called by the data processor system, providing the memory objects A 405 and B 406 corresponding to the graphical object GA and GB respectively. The program then performs some activity, typically relating to the memory objects A and B.

Figure 6:
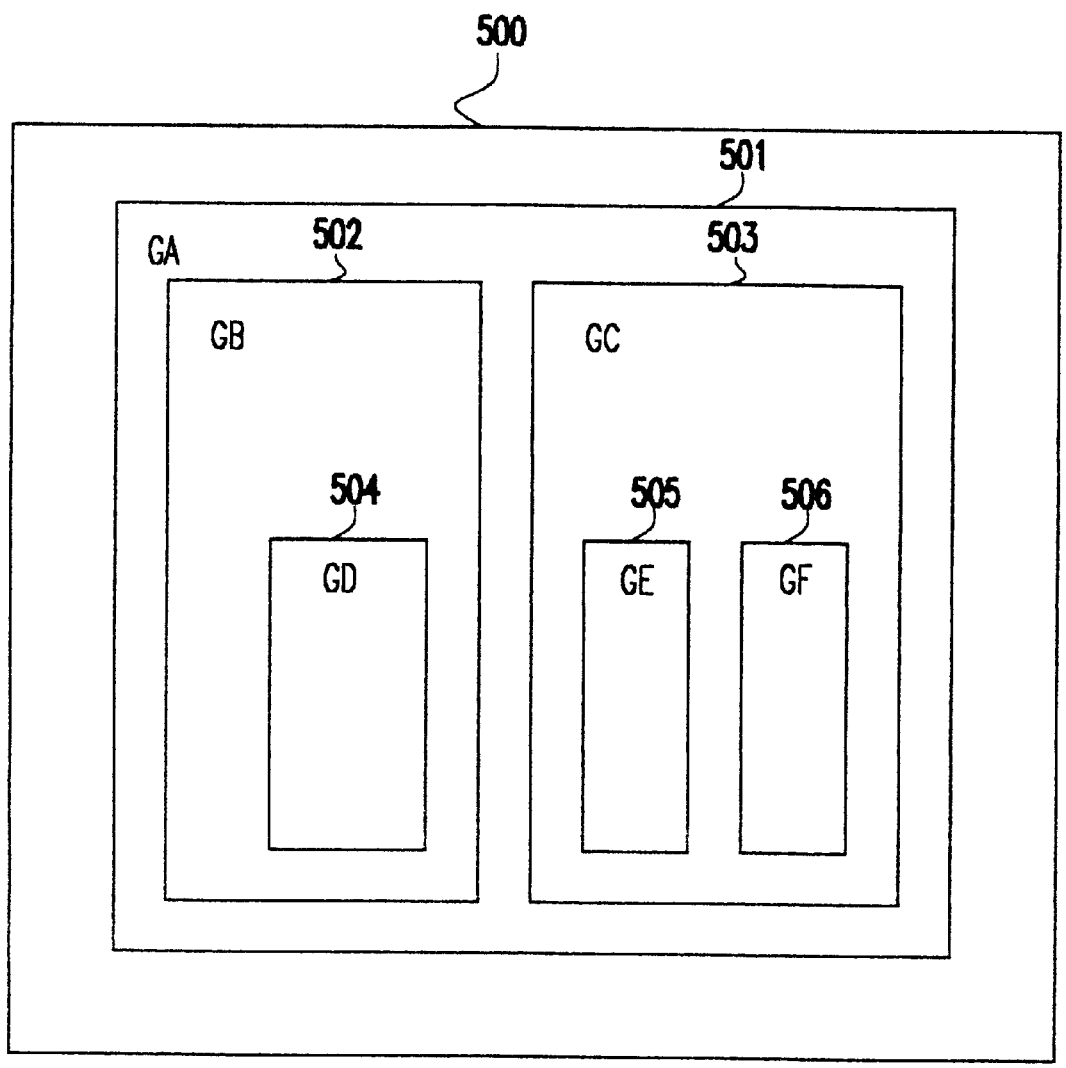
FIG. 6 shows a hierarchically structured visual on a display screen.
Figure 7:
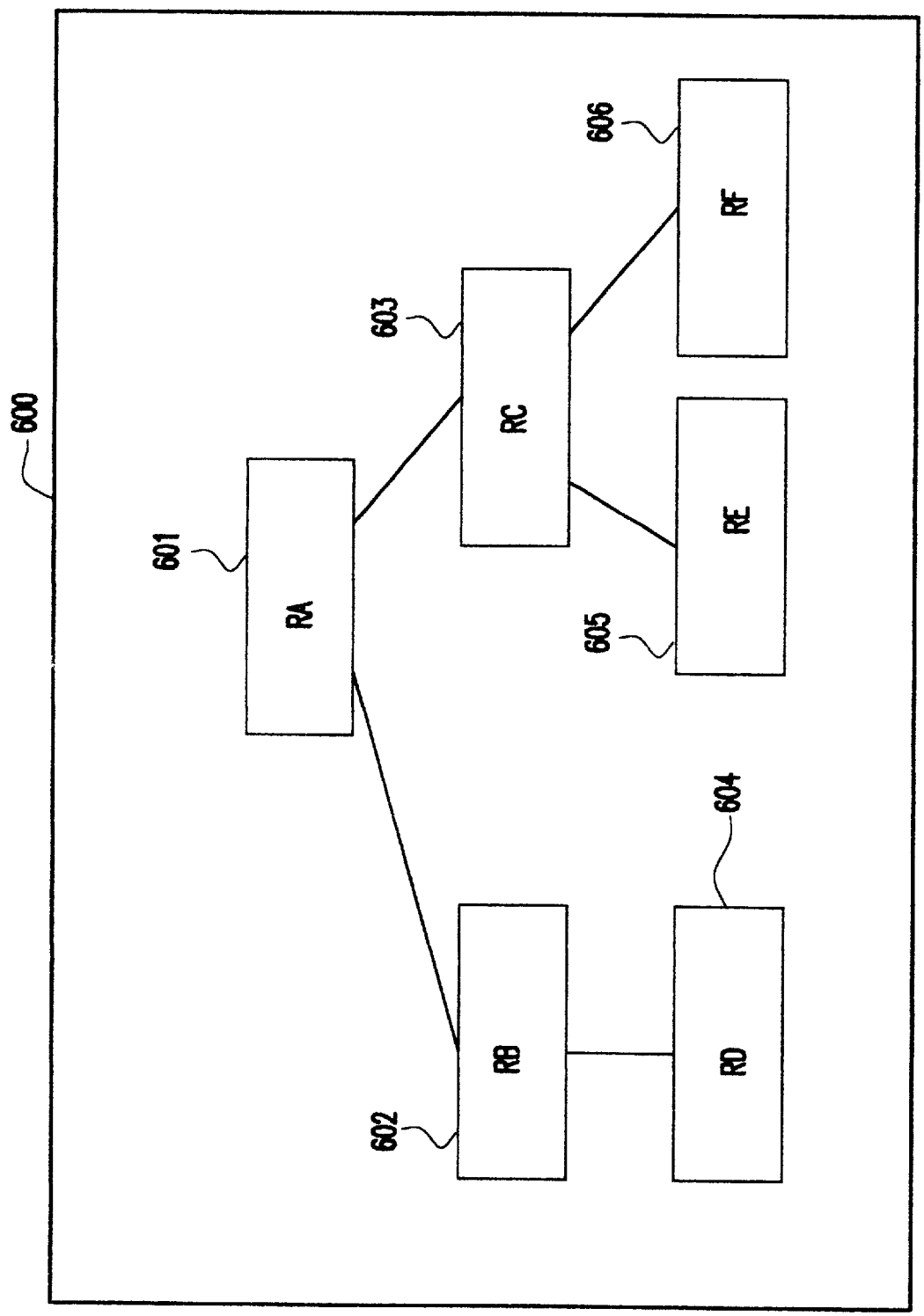
FIG. 7 shows a memory object structure corresponding to a hierarchically structured visual.

The present invention pertains to the use of direct manipulation on hierarchically structured visuals, also referred to as visual objects. FIGS. 6 and 7 illustrate the composition of a visual object by nested graphical elements. FIG. 6 shows a visual object on a display screen 500. The visual object is composed of a main graphical object GA 501, which contains graphical objects GB 502 and GC 503. GB 502 contains graphical object GD 504. GC 503 contains graphical objects GE 505 and GF 506. In many window systems, hierarchical graphical containment of this sort is achieved by nesting windows within windows. This present invention is not limited to this type of nesting. Other techniques such as drawing nested images would also suffice. What is required, however, is that the underlying graphical system is capable of initiating direct manipulation on any nested graphical element.

FIG. 7 shows the organization of runtime objects in memory 600 corresponding to the graphical elements depicted in FIG. 6. Here is shown a hierarchical structure of memory runtime objects. The implementation of the hierarchy is of no relevance, except that a computer program must be able to traverse the tree node to node. There is shown in FIG. 7 a memory object RA 601 corresponding to graphical element GA 501, which has as children memory objects RB 602 and RC 603, corresponding to graphical elements GB 502 and GC 503. Object RB has object RD 604 as a child, corresponding to GD 504. Object RC has children objects RE 605 and RF 606, corresponding to graphical elements GE 505 and GF 506.

The present invention concerns the details for a process of specifying direct manipulation relationships between graphical elements of hierarchically structured visuals, referred to now as the relationship definition process. The input to this process consists of two definitions of visual objects. The two input definitions may be identical. The output of this process is an augmentation to these visual object definitions indicating direct manipulation relationships between host and guest graphical elements. Direct manipulation relationship information includes the identities of the host and guest graphical elements, optional keyboard key depression information, and optionally, information pertaining to actions to be performed when these relationship are realized or acted out in an actual application using these definitions.

Figure 8:
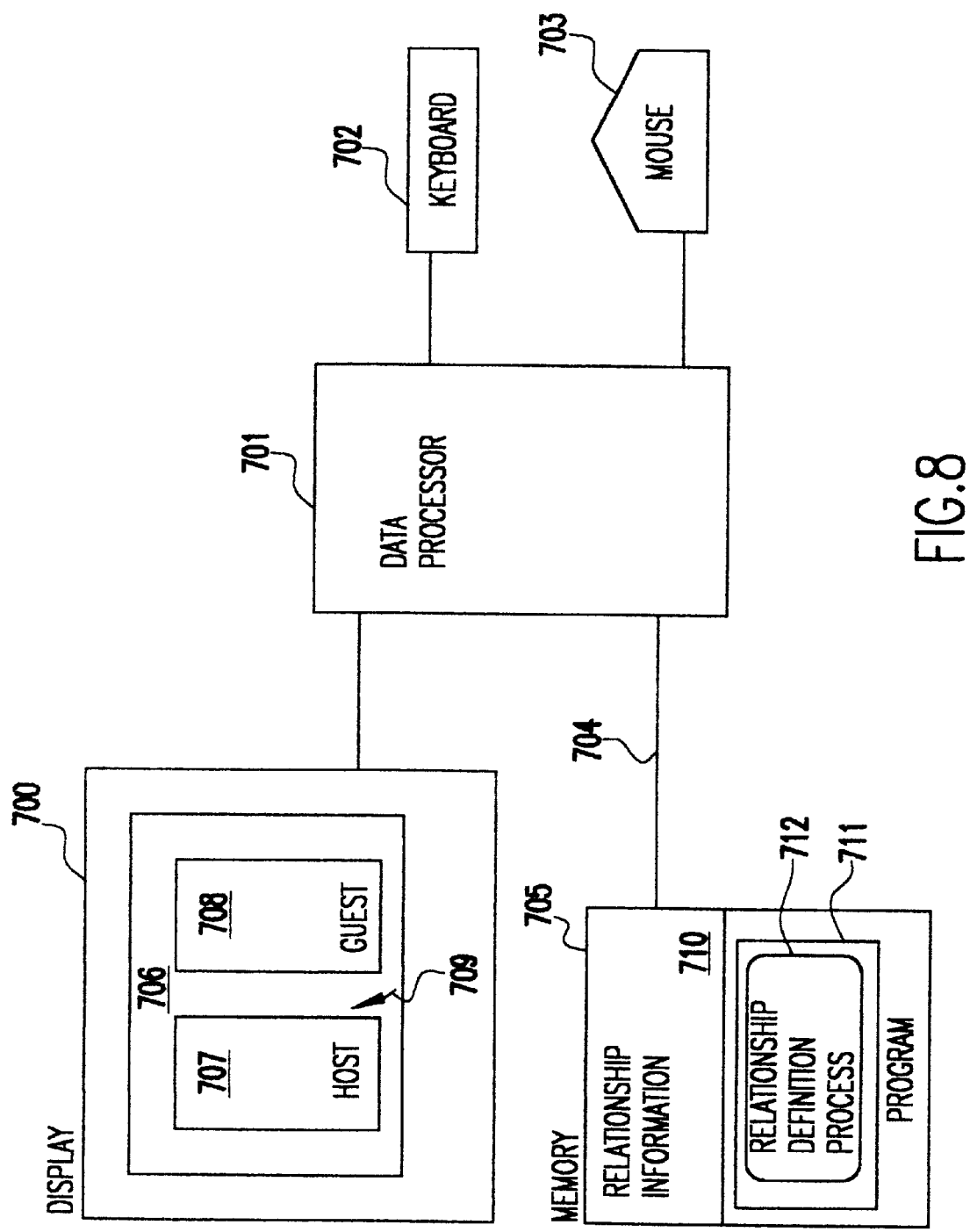
FIG. 8 shows the use of the relationship process in an application.

FIG. 8 shows a context in which the relationship definition process is utilized. Here is shown a computing system similar to that of FIG. 1. A computer display 700 is connected to a processing system 701, which in turn has attached to it a keyboard input device 702, and a mouse input device 703. Also attached to the data processor through a high-speed bus 704 is a memory 705. The display shows a window 706 displaying two visual objects between which direct manipulation relationships are to be defined, a host visual object 707 and a guest visual object 708. There is also shown a pointer 709 that is repositioned by the mouse 703 for direct manipulation purposes. In the memory 705 are data 710 for the definition and management of direct manipulations between host and guest graphical elements. There is also a computer program 711 that as part of its implementation contains an embodiment of the relationship definition process 712. The general purpose of this invention is not to be a process unto itself but one that can be utilized in multiple contexts. Similarly, the window 706 containing the host and guest visual objects is but one possible manner of display. The essential part is that at least one host and one guest are visible and manageable through the relationship process, in some fashion for the application(s).

Figure 9:
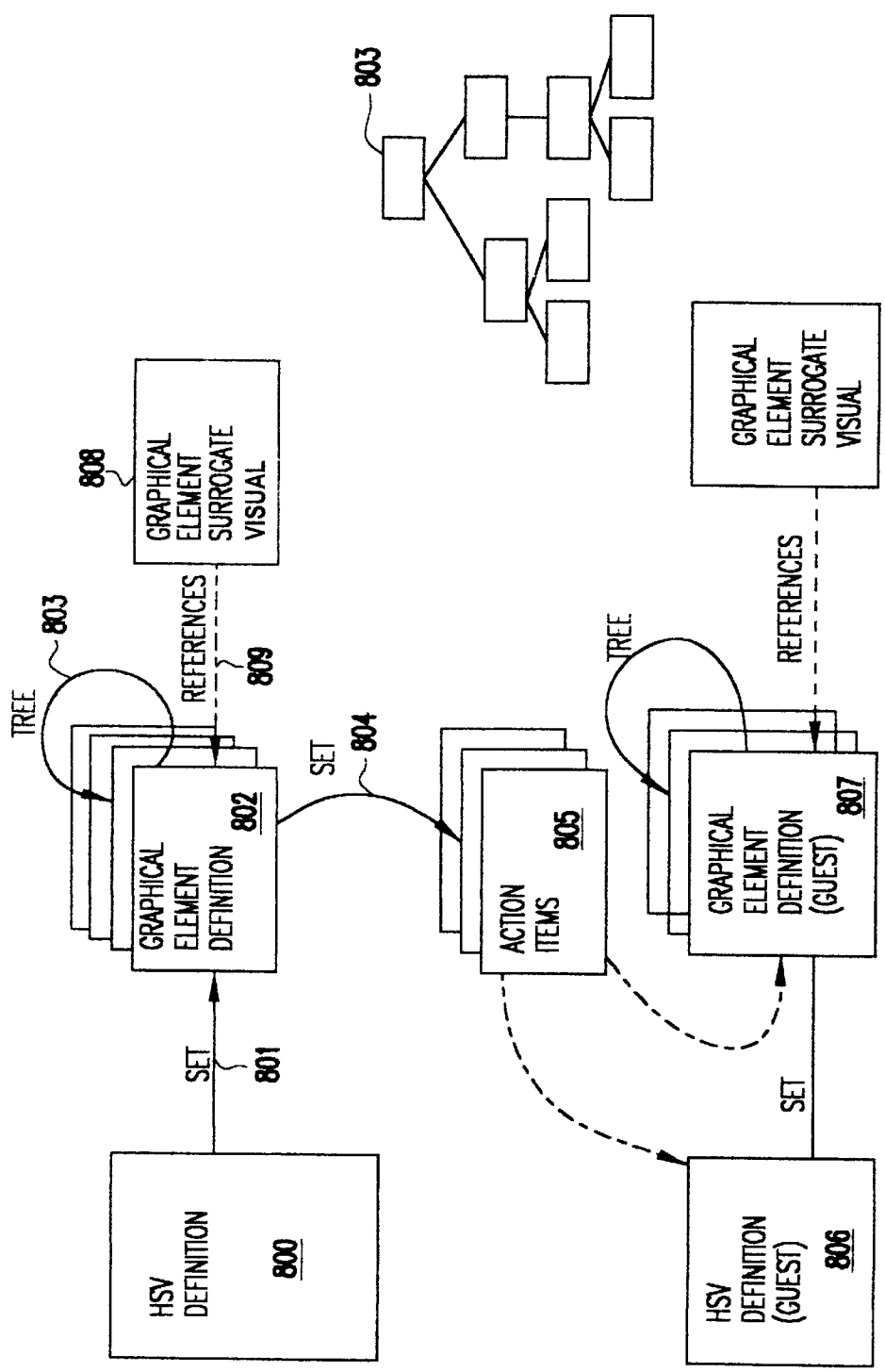
FIG. 9 shows the data information for hierarchically structured visuals used in the relationship process.

FIG. 9 shows data information regarding visual object definitions. It contains information regarding the hierarchical structure of a visual object as graphical elements. It also contains sufficient information to define, search, and reconstruct direct manipulation relationships that will be defined by the relationship definition process. Additionally, it may contain sufficient information so that the visual objects can be constructed. Therefore, it may contain detailed information regarding graphical elements such as relative positions of graphical elements, and the like. It may also contain any related information regarding color, border colors, etc. This information is dependent upon intended use of the visual objects used by applications or systems.

FIG. 9 shows data information to be maintained by the relationship definition process. Each type of hierarchically structured visual (HSV) has a definition 800. The HSV definition has a set 801 of graphical element definitions 802. These graphical element definitions are structured as a tree 803. The actual implementation of this tree structure is of little relevance except that a computer system must be capable of traversing the nodes of the tree. Each graphical element definition also has a set 804 of action items. Each action item 805 maintains information regarding direct manipulation relationships wherein the owning graphical element definition is the host. The guest information consists of references to another (but possibly the same) HSV definition 806 and one of its graphical element definitions 807.

In the process that defines direct manipulation relationships between graphical elements, actual instances of visual objects are not used, for after all, the focus of the process is to define direct manipulation relationships. Therefore, graphical elements in the relationship definition process have a different behavior from that of, say, applications that utilize them. Instead, this process uses a surrogate graphical element 808 that serves as a presentation space representation of a graphical element definition in this process. Generally, the surrogate corresponds to a displayed graphical element similar to that would be seen in an application. This is called a visual graphical element surrogate. The surrogate graphical element is also assumed to be the key data that ties programming logic to the window system's direct manipulation system. This surrogate references 809 the corresponding graphical element definition.

Figure 10:
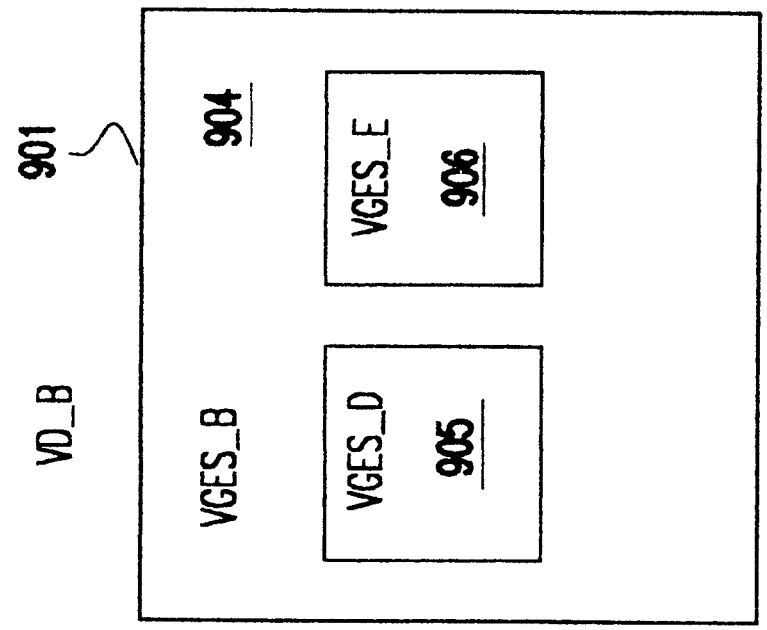
FIG. 10 shows an example of hierarchical structured visuals used by the relationship process.
Figure 10:
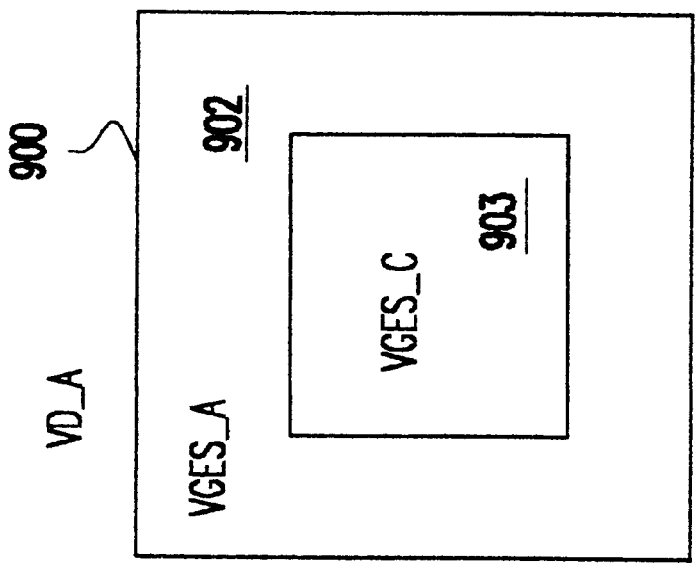
Figure 11:
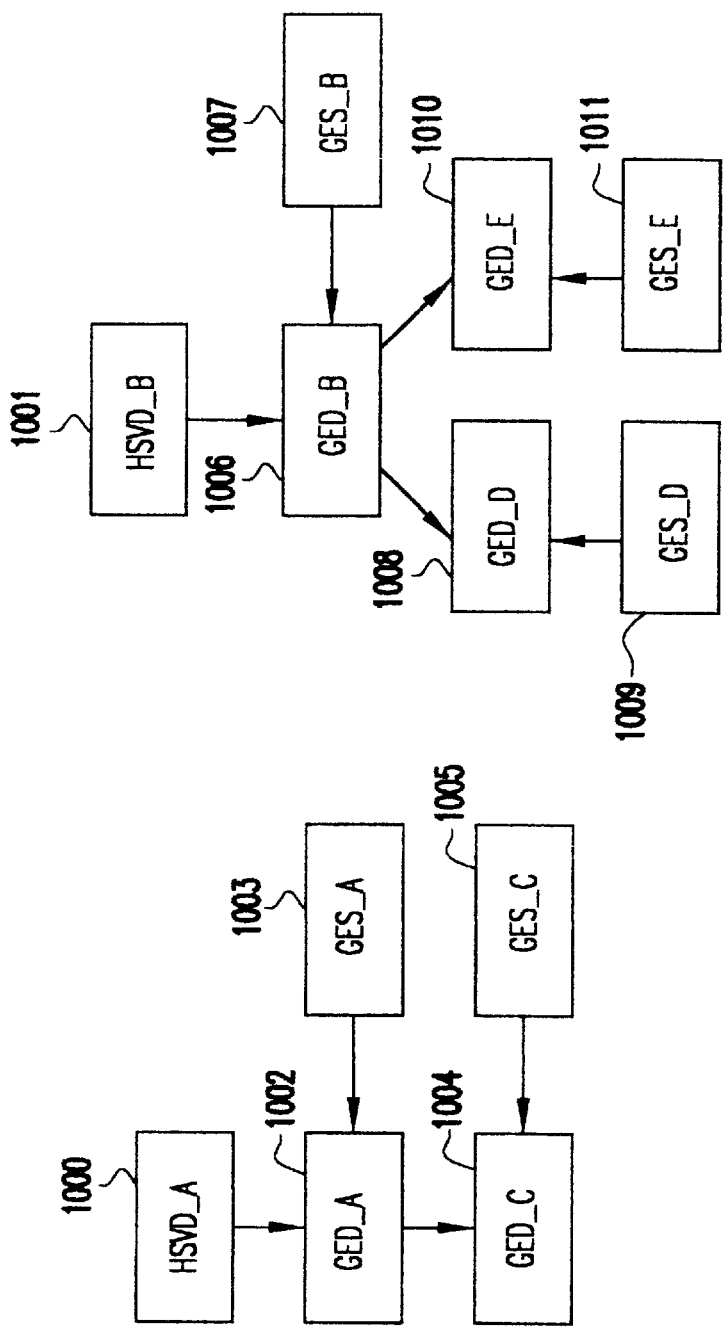
FIG. 11 shows an example of instances of the data information corresponding to FIG. 10.

FIGS. 10 and 11 depict an example of hierarchical structured visuals and instances of the data information described above as used by the relationship definition process. FIG. 10 shows two instances of visual objects 900 and 901. VD__A, 900 consists of a visual graphical element surrogate VGES__A 902 and within that is nested VGES__C 903. VD__B 901 consists of a visual graphical element surrogate VGES__B 904 within which are contained two visual graphical element surrogates VGES__D 905 and VGES__E 906.

FIG. 11 shows the data instances maintained by the relationship definition process for the two visual objects described in FIG. 10. Corresponding to VD__A 900 is a hierarchical structured definition HSVD__A 1000, and to VD__B 901 is HSVD-B 1001. HSVD__A references a graphical element definition GED__A 1002, which is also referenced by graphical element surrogate GES__A 1003 which manages the visual graphical element surrogate VGES__A 901. GED__A 1002 references the graphical element definition GED__C 1004, which is also referenced by graphical element surrogate GES__C 1005, which manages the visual graphical element surrogate VGES__C 903. Similarly, HSVD__B references graphical element definition GED__B 1006, also referenced by graphical element surrogate GES__B 1007, which manages the visual graphical element surrogate VGES__B 904. GED__B has two children graphical element definitions GED__D 1008 and GED__E 1010. Graphical element surrogate GES__D 1009 references GED__D 1008 and manages VGES__D 905. Graphical element surrogate GES__E 1011 references GED__E 1010 and manages VGES__E 906.

The relationship definition process consists of keeping track of direct manipulation relationships that a user defines using visual objects. More specifically, a user selects a guest graphical element in a visual object and drops it onto a host graphical element in a visual object. That direct manipulation action is then stored into data as depicted in FIG. 9. The driving logic is in three parts, namely the beginning of a direct manipulation, the dragging-over part of direct manipulation, and the dropping part of direct manipulation. These are shown in FIGS. 12, 13 and 14.

Two properties of the graphical element definition referenced in the accompanying logic should be noted. One property, called the "dont_allow_drag" property, when true, indicates that the graphical element cannot be dragged as a guest. Similarly, another property called "dont_drag_ onto", when true, indicates that guest graphical elements cannot be dropped onto it. While these properties are observed in the logic, they are in fact ancillary to the process, and so are not truly necessary. They enable a feature that provides stability to defining direct manipulation relationship on hierarchically structured visuals. For example, some graphical elements are purely informative or decorative, and have no need to be involved in direct manipulation. The values for these properties can be trivially set, e.g. by way of a pop-up menu on the graphical element indicating value setting for the graphical element, leading to setting the property. This, however, is logic that is not key to the relationship process.

Figure 12:
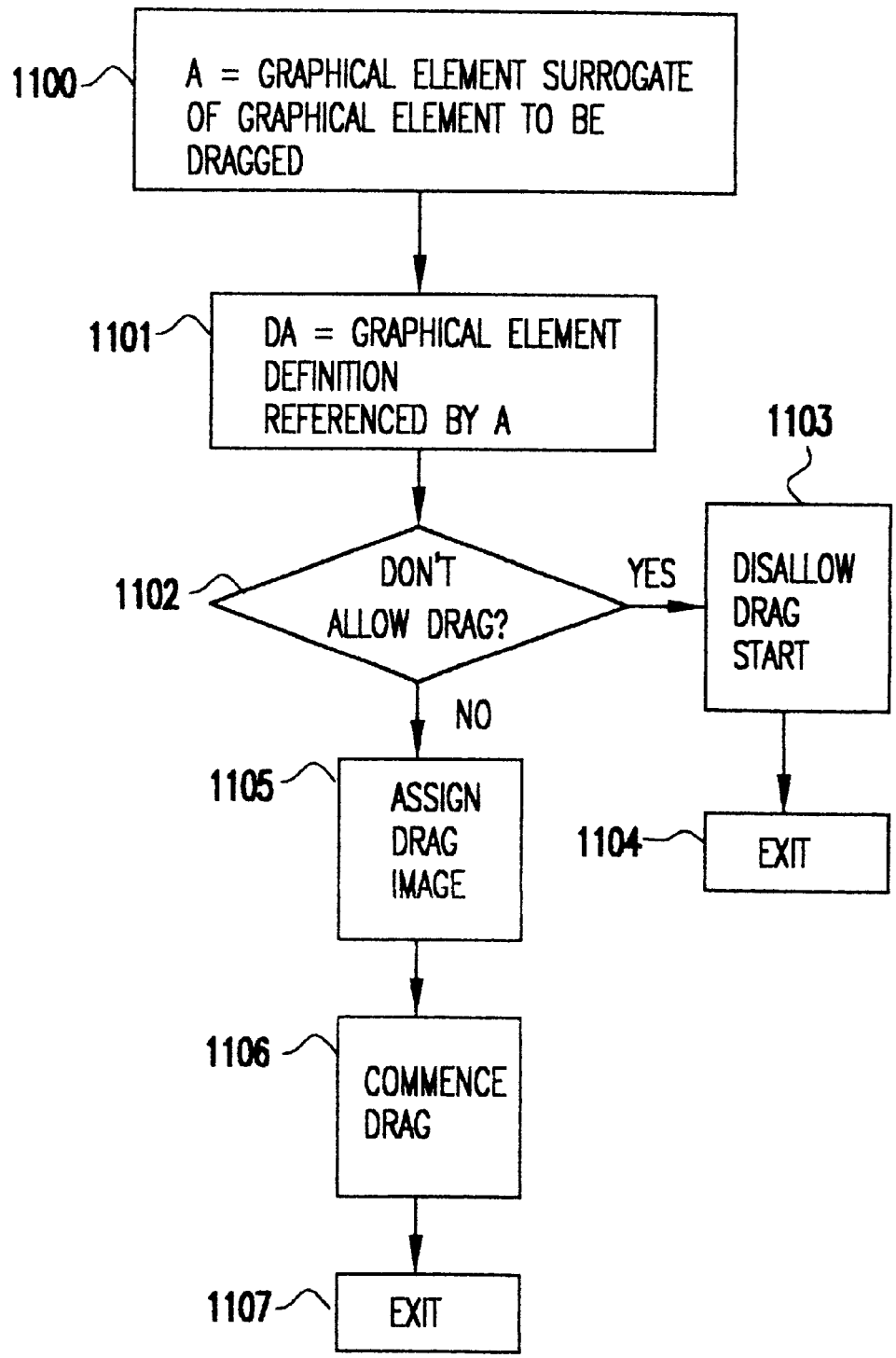
FIG. 12 is a flow diagram for starting a drag operation in the relationship process.

FIG. 12 is a flow diagram for starting a drag operation on a graphical element serving as a guest in the relationship definition process. One starts with being given the graphical element surrogate for the graphical element to be dragged 1100. From this, one references the graphical element definition associated with the surrogate 1101. A check is made to see if the "dont_allow_drag" property on DA is set 1102. If so, the drag start event is rejected 1103, and the program exits 1104. Otherwise a drag image is assigned for direct manipulation of the graphical element 1105, and the direct manipulation is allowed to begin 1106, and the program exits 1107.

Figure 13:
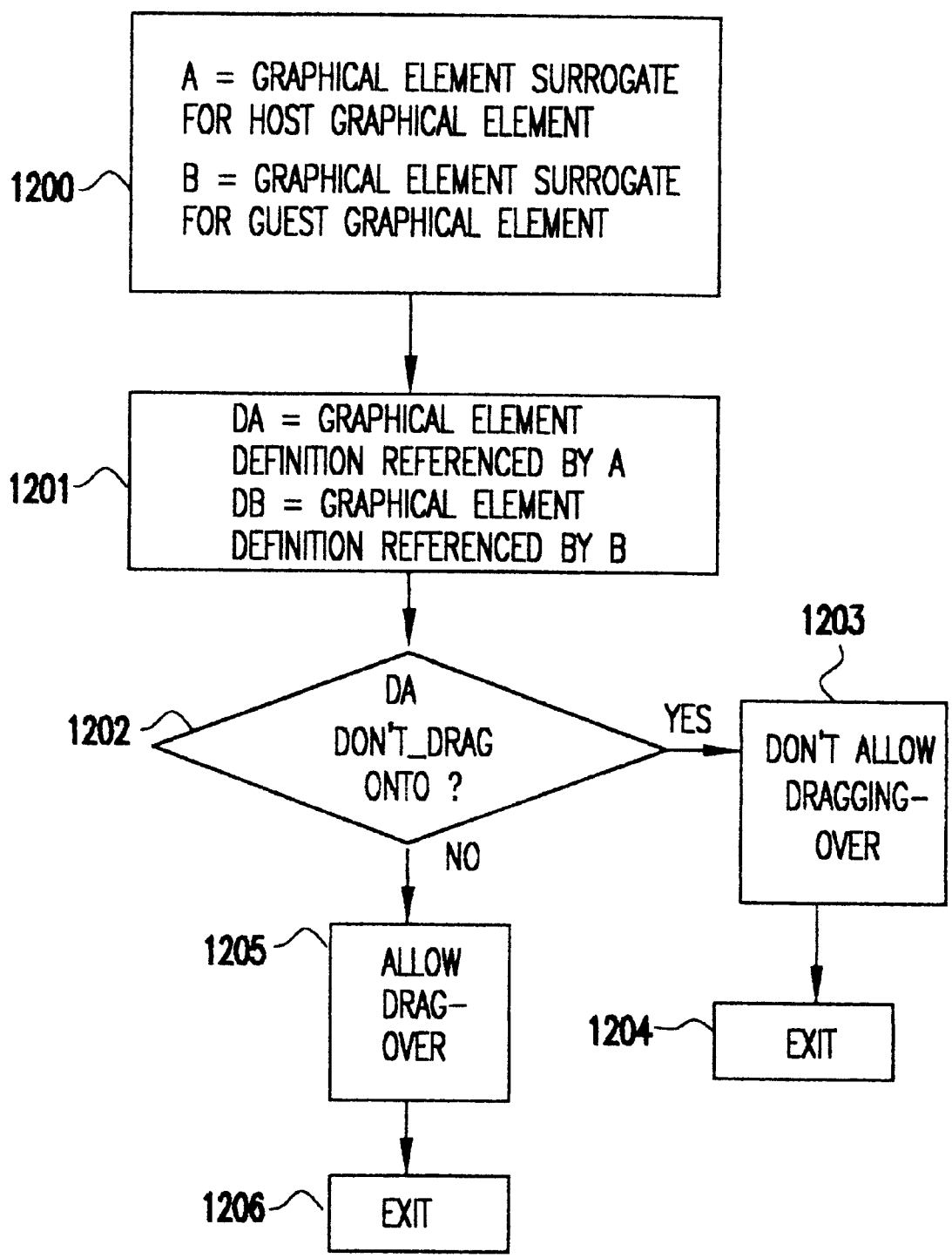
FIG. 13 is a flow diagram for dragging-over in the relationship process.
Figure 14:
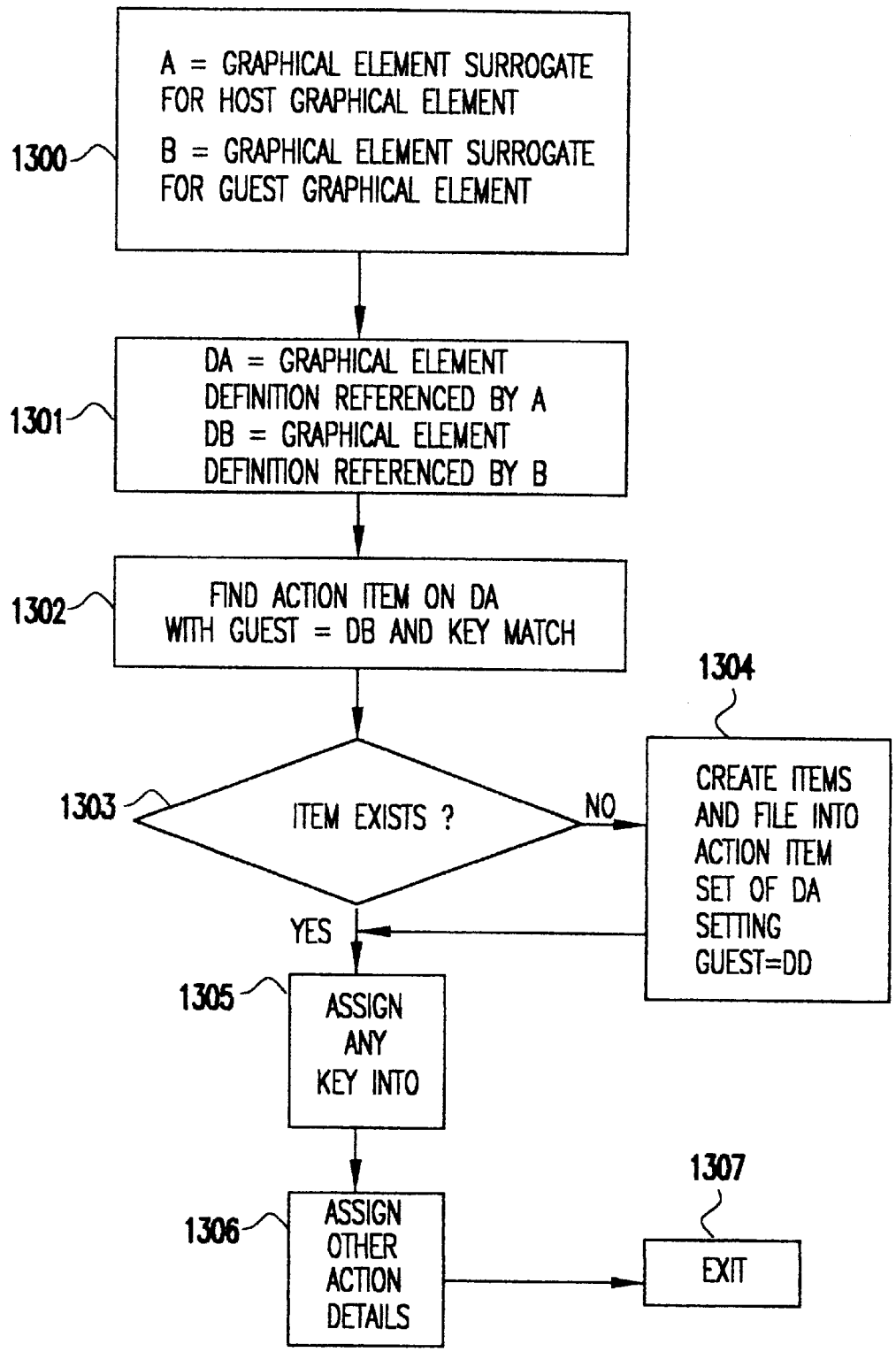
FIG. 14 is a flow diagram for dropping in a relationship process.

FIG. 13 is a flow diagram for dragging-over a host graphical element with a guest graphical element in the relationship definition process. One starts with being given the graphical element surrogates for the host graphical element A, and the guest graphical element B 1200. From these DA, the graphical element definition of A, and DB, the graphical element definition of B, are obtained by references 1201. A check is made to see if the host DA's "dont_drag_onto" flag is set 1202. If yes, the dragging-over operation is disallowed 1203, and the program exits 1204. Otherwise, if dragging-over is allowed, direct manipulation is allowed 1205, and the program exits 1206.

FIG. 14 is a flow diagram for dropping a guest graphical element onto a host graphical element in the relationship definition process. One starts with being given the graphical element surrogates for the host graphical element A, and the guest graphical element B 1300. From these DA, the graphical element definition of A, and DB, the graphical element definition of B, are obtained by references 1301. A search 1302 is made to find an action item using DA as host and DB as guest and with the current keyboard keys down. This search is trivially done by checking the set of action items associated with DB (reference 804 on FIG. 9). A check is made to see if the action item exists 1303. If the item does not exist, an action item is created 1304 with DB assigned as the guest, and the action item is put into the set of action items associated with DA. Following that or if the action item had been found in 1303, additional information about which keyboard keys may be utilized in this direct manipulation definition is filled in 1305. Other information regarding the action associated with this direct manipulation is also filled in 1306. This information is dependent on the intended use of the relationship definition process and may be relegated to a program hosting the relationship definition process, but does define the kind of action that this direct manipulation triggers. Finally, the program exits 1307.

Figure 15:
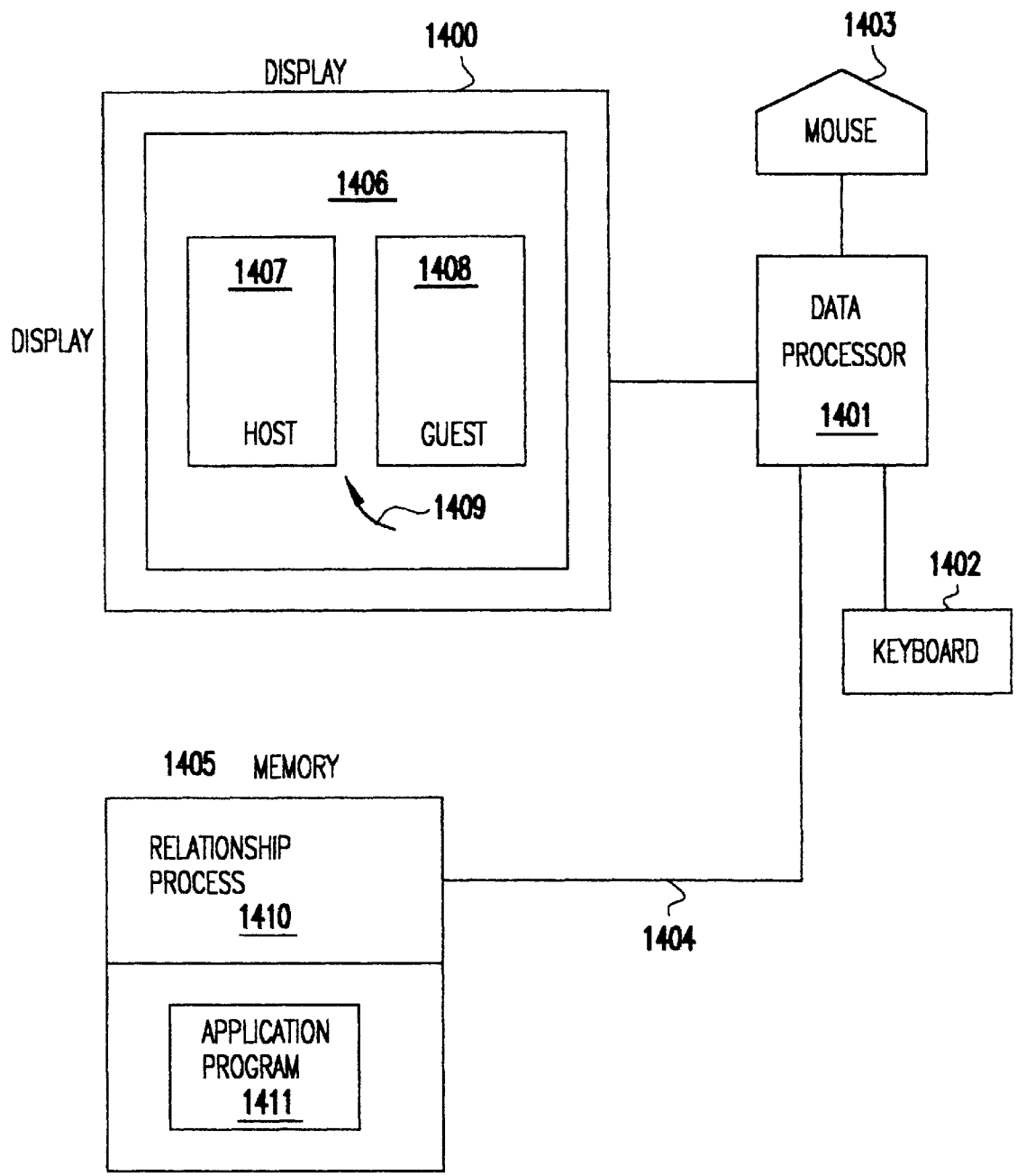
FIG. 15 shows the use of relationship data in an application.

How an application program may utilize the information obtained from the relationship definition process is now examined. In FIG. 15 shows a computing system similar to that of FIGS. 1 and 8. A computer display 1400 is connected to a processing system 1401, which in turn has attached to it a keyboard input device 1402, and a mouse input device 1403. Also attached to the processor through a high-speed bus 1404 is a memory 1405. The display shows a window 1406 displaying two visual objects between which direct manipulation relationships had been defined using the relationship process, a host visual object 1407 and a guest visual object 1408. There is also shown a pointer 1409 that is repositioned by the mouse 1403 for direct manipulation purposes. In the memory 1405 are data 1410 holding information about defined direct manipulation relationships.

There is also a computer program 1411 that utilizes that information. This shows the general use of the relationship information, but many variations on this usage are possible. There are also many possible variations on how the guest and host visual objects are displayed. The essential element of this is that at least one host and one guest are visible, and corresponding relationship information exists for the purposes of determining direct manipulation activity.

Figure 16:
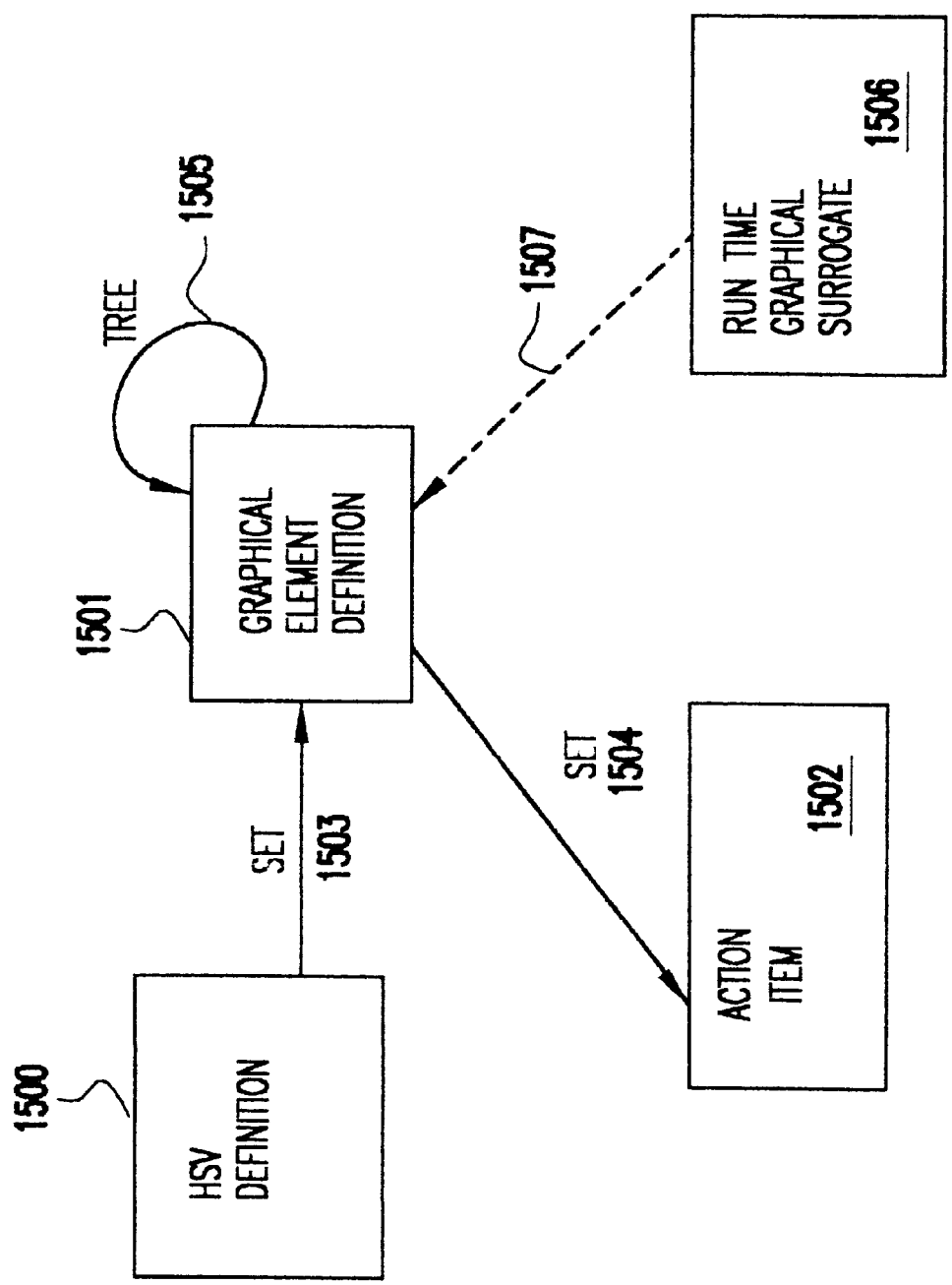
FIG. 16 shows the data information for hierarchically structured visuals used in an application program.

FIG. 16 shows the data structure information utilized by the process, which in part is similar to that found in FIG. 9. The data that are reused from the relationship definition process are the hierarchical structured visual definition 1500, graphical element definition 1501, and action item 1502. Along with that are the set relationships 1503 and 1504, as well as the hierarchical structure of graphical element definition 1505. In this context, in place of the graphical element surrogate which are used in particular for the relationship process, an object appropriate for the application program is used, namely the runtime graphical surrogate 1506. This is the key data that ties the programming logic to the window system's direct manipulation system. The runtime graphical surrogate is constructed so to reference 1507 the graphical element definition with which it is associated.

The application process merely utilizes the direct manipulation information to allow/disallow various direct manipulation processes, and in the case where a drop is allowed, trigger an associated action. The logic driving this is in three parts, namely the beginning of a direct manipulation, the dragging-over part of direct manipulation, and the dropping part of direct manipulation. These are shown in FIGS. 17, 18, and 19.

Figure 17:
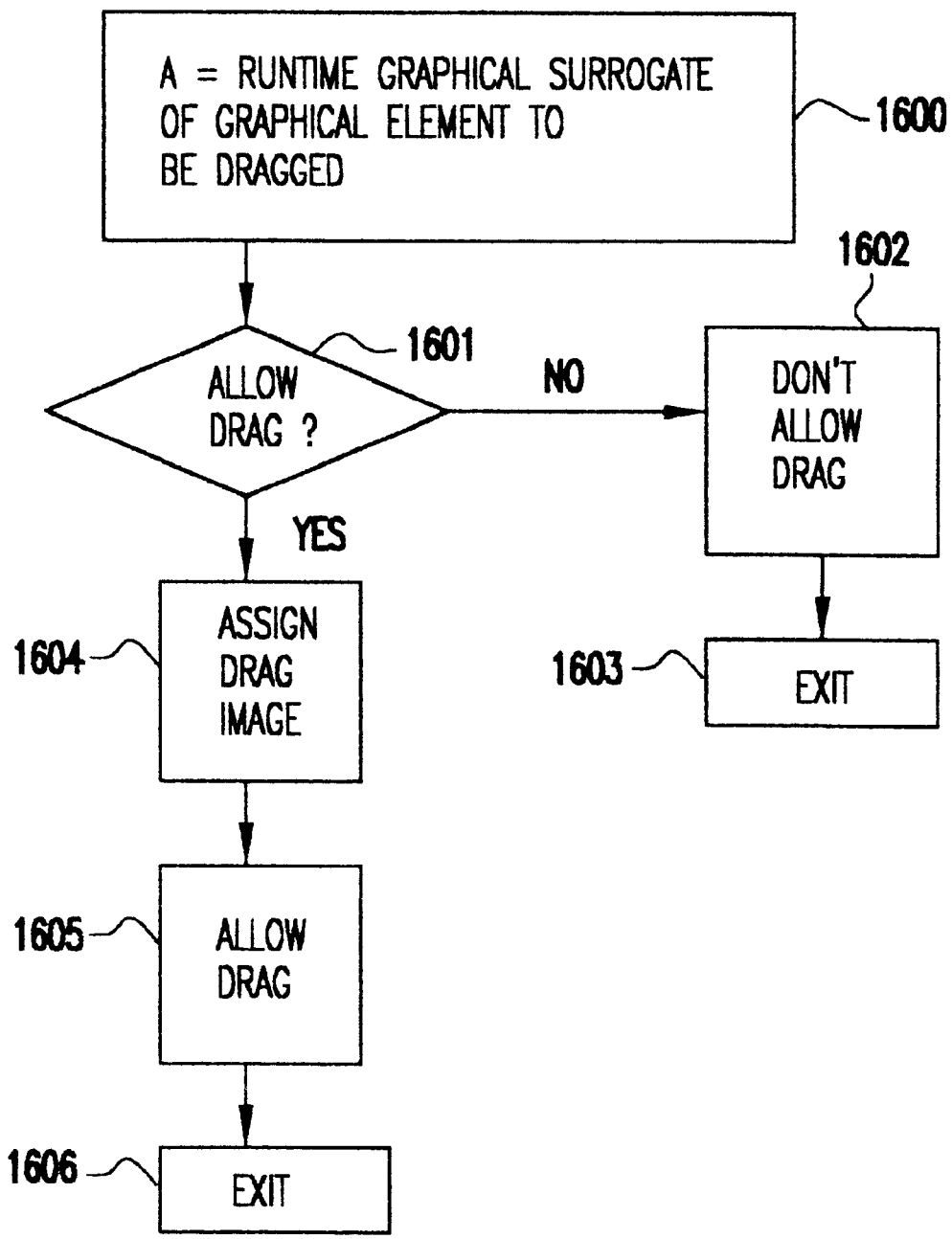
FIG. 17 is a flow diagram for starting a drag operation in an application process using relationship data.

FIG. 17 shows the logic for starting a drag operation on a graphical element serving as a guest in an application process. This process is trivial, since unlike the relationship definition process wherein graphical elements could be disallowed by for drag-drop definition, in an application process typically all graphical elements can be dragged, barring application-level considerations. One could utilize the "dont_allow_drag" property of the graphical element definition to disallow the drag, but that decision is not essential to the following logic. The process starts with the runtime graphical surrogate of the graphical element to be dragged 1600. An application level decision is made to see if the drag should be allowed 1601. If no, the drag is not allowed 1602, and the program exits 1603. Otherwise, a drag image is assigned 1604, and the drag commences 1605, and the program exits 1606.

Figure 18:
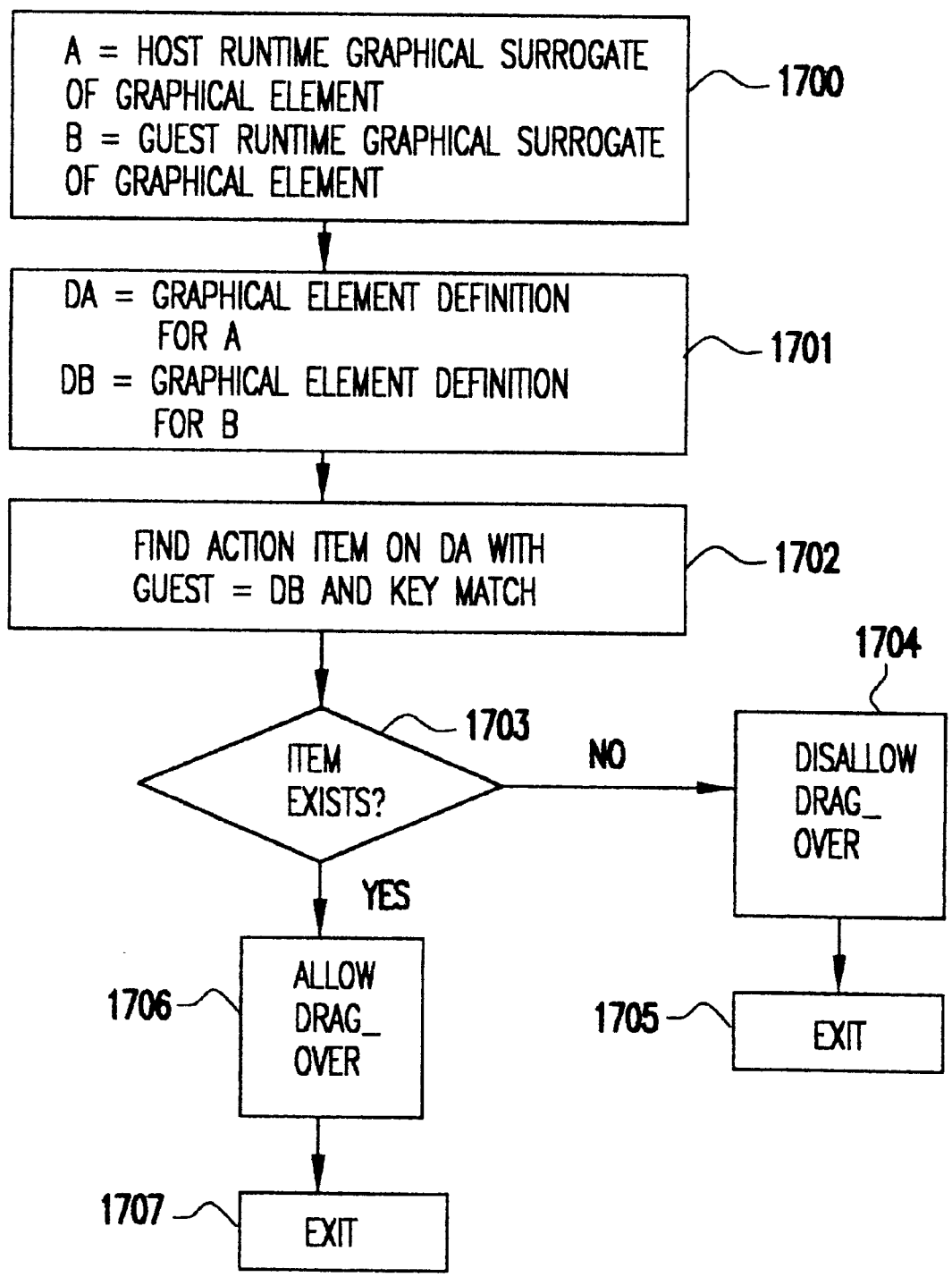
FIG. 18 is a flow diagram for dragging-over in an application process using relationship data.

FIG. 18 shows the logic for dragging-over a host graphical element with a guest graphical element in an application process. The process commences 1700 with A, the host runtime graphical surrogate for the host graphical element and B, the guest runtime graphical surrogate for the guest graphical element. These are typically given by the direct manipulation system of the window system. Then DA, the graphical element definition of A, and DB, the graphical element definition of B, are obtained 1701, using the back references on the runtime graphical surrogates. Then a search 1702 is made through action items of the host DA, for guest DB and a match on the current keyboard keys being pressed. A test is made to see if the item exists 1703. If it does not exist, we disallow the drag-over 1704 and exit 1705. Otherwise, the drag-over is allowed 1706 and the program exits 1707.

Figure 19:
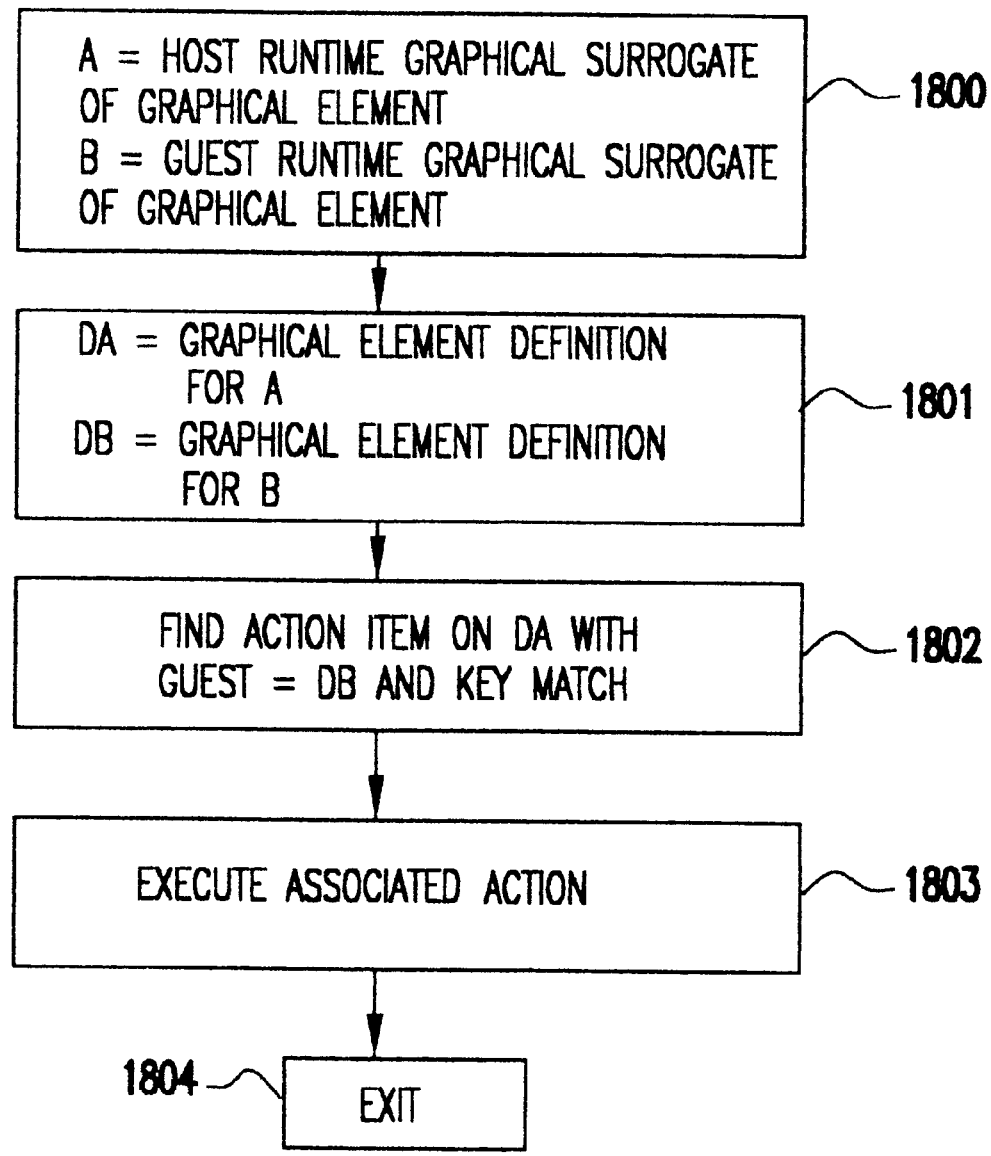
FIG. 19 is a flow diagram for dropping in an application process using relationship data.

FIG. 19 shows the logic for dropping a guest graphical element onto a host graphical element in an application process. The process commences 1800 with A, the host runtime graphical surrogate for the host graphical element, and B, the guest runtime graphical surrogate for the guest graphical element. These are typically given by the direct manipulation system of the window system. Then DA, the graphical element definition of A, and DB, the graphical element definition of B, are obtained 1801, using the back references on the runtime graphical surrogates. Then a search 1802 is made through action items of the host DA, for guest DB and a match on the current keyboard keys being pressed. This match is assured to succeed because the drop-over was allowed. Using information on the action item, the associated action for this direct manipulation is executed 1803. Finally, the program exits 1804.

As an example of usage within a visual programming language, once a user has defined the desired manipulations and associated actions, this data could be used to generate executable program code. The preferred method for generating the code is disclosed in copending patent application for "Utilizing Programming Object Visual Representing for Code Genteration", U.S. patent application Ser. No. 09/431, 152, supra. For instance, in the preferred embodiment, a user views a selected visual representation of a number of programming objects on a display device. These programming objects may be related by subclass or superclass membership, or may be contained in one another. The graphical elements of a programming object are defined by object type and possibly by the object state. The user manipulates the programming objects, for instance using a keyboard and pointing device. Each manipulation, or a combination of predefined manipulations is considered an action performed on the graphical elements, as described above. The actions are detected by a visual programming language code generator which generated program statements in a selected target computer language and stores them as program segments in memory or persistent storage, as desired.

While the invention has been described in terms of a single preferred embodiment, those skilled in the art will recognize that the invention can be practiced with modification within the spirit and scope of the appended claims.

I claim:

1. A method for defining direct manipulation relationships between graphical elements in hierarchically structured visuals, said method comprising the steps of:

inputting a host graphical element of a first visual object definition, and a guest graphical element of a second visual object definition;

defining a gesture corresponding to manipulation of the two visual object definitions that were input in the inputting step;

associating an action with the gesture; and storing information in memory that defines the gesture of graphical elements in memory, and its associated action, said information used to augment the two visual object definitions to indicate direct manipulation relationships between the host and guest graphical elements wherein said object and gesture definitions are in a form specifiable to an application dynamically without being coded within said application.

2. A method as recited in claim 1, wherein the step of defining a gesture further comprises the steps of:

displaying a plurality of visual objects on a display device, each visual object being a visual depiction of its definition comprised of surrogate visual graphical elements representing graphical elements of the definition;

selecting a guest surrogate visual graphical element in a visual object; and dragging and dropping the selected guest surrogate visual graphical element onto a host surrogate graphical element.

3. A method as recited in claim 1, wherein the information indicating direct manipulation relationships includes the identities of the host and guest graphical elements, and optionally, keyboard key depression information and information pertaining to actions to be performed when these relationships are realized or acted out in an actual application using these definitions; and the stored information comprises the direct manipulation relationship information, wherein hierarchically structured visual definitions are represented as graphical elements having a corresponding set of graphical element definitions, the graphical definitions structured in a tree and each graphical element definition having a corresponding set of action items having information regarding direct manipulation relationships.

4. A method as recited in claim 3, wherein the host graphical element has a definition for information pertaining to actions to be performed and guest information for a guest element has references to a hierarchically structured visual definition and one of the set of corresponding graphical element definitions.

5. A method as recited in claim 3, wherein surrogate graphical elements correspond to displayed graphical elements.

6. A method as recited in claim 3, wherein the direct manipulation relationship information is utilized to enforce the relationships within an application.

7. A method as recited in claim 3, wherein a graphical element is restricted from engaging as a guest in a direct manipulation relationship.

8. A method as recited in claim 3, wherein a graphical element is restricted from engaging as a host in a direct manipulation relationship.

9. An apparatus for defining direct manipulation relationships between graphical elements in hierarchically structured visuals, comprising:

a data processing system comprising a display device, an interactive device, as in a keyboard, a pointing device, a storage device, and a data processor;

memory coupled to the data processor via a bidirectional bus, wherein the memory includes a first memory section for at least one program and a second memory section for data;

computer code comprising a relationship defining process, wherein the computer code is stored in the first memory section, and the computer code defines direct manipulation relationships between graphical elements in hierarchically structured visuals;

hierarchically structured visual relationship definitions stored in the second memory section, having definitions for nested guest and host visual objects, and definitions indicating direct manipulation relationships between host and guest graphical elements; and a graphical system capable of initiating direct manipulation of a nested graphical element, wherein said visual relationship definitions are in a form specifiable to an application dynamically without being coded within said application.

10. A computer readable medium containing code for defining direct manipulation relationships between graphical elements in hierarchically structured visuals, the code implementing the steps of:

inputting two visual object definitions, the first visual object definition being for a host graphical element and the second visual object definition being for a guest graphical element;

displaying a plurality of visual objects on a display device;

defining a gesture corresponding to manipulation of the two visual object definitions;

associating an action with the gesture; and storing information in memory that defines the gesture of graphical elements in memory, and its associated action, said information used to augment the two visual object definitions to indicate direct manipulation relationships between the host and guest graphical elements, wherein said object and gesture definitions are in a form specifiable to an application dynamically without being coded within said application.

11. A method for executing direct manipulations between graphical elements in hierarchically structured visuals based on relationship information data derived from a relationship definition process, said method comprising the steps of:

initiating a direct manipulation on an identified graphical element, the identified graphical element being a member of a set of graphical elements wherein each graphical element in the set has relationship information about other graphical elements in the set with which the graphical element has a direct manipulation relationship, and the relationship information comprises a visual object definition comprising a set of graphical elements, and a identification of actions to take place when a selected direct manipulation is executed;

assigning a drag image for the direct manipulation initiated in the initiating step;

determining if a direct manipulation relationship exists between a dragging graphical element and a dragged-over graphical element by referring to the relationship information associated with the graphical elements to be manipulated, if the direct manipulation initiated in the initiating step is a drag-over operation, and if the direct manipulation relationship exists allowing the operation, but if the direct manipulation relationship does not exist, then disallowing the operation; and determining if a direct manipulation relationship exists between a dropped-onto graphical element and a dropping graphical element by referring to the relationship information associated with the graphical elements to be manipulated, if the direct manipulation initiated in the initiating step is a drop-onto operation, and if the direct manipulation relationship exists allowing the operation, but if the direct manipulation relationship does not exist, then disallowing the operation, wherein said relationship information is in a form specifiable to an application dynamically without being coded within said application.

12. A method as recited in claim 11, wherein the identified graphical element functions as a dropped-onto graphical element.

13. A method as recited in claim 11, wherein the identified graphical element functions as a dragged-over graphical element.

14. A method as recited in claim 11, wherein the relationship definition is defined by performing the steps of:

inputting a host graphical element of a first visual object definition, and a guest graphical element of a second visual object definition;

defining a gesture corresponding to manipulation of the two visual object definitions that were input in the inputting step;

associating an action with the gesture; and storing information in memory that defines the gesture of graphical elements in memory, and its associated action, said information used to augment the two visual object definitions to indicate direct manipulation relationships between the host and guest graphical elements.

* * * * *